Sept. 12, 1961       J. A. SICH, JR       2,999,330
SPINNING LURE
Filed Oct. 10, 1958

INVENTOR.
JOHN A. SICH JR.
BY
*W. B. Harpman*
ATTORNEY

# United States Patent Office 2,999,330
Patented Sept. 12, 1961

2,999,330
SPINNING LURE
John A. Sich, Jr., 3520 Hudson Drive,
Youngstown 11, Ohio
Filed Oct. 10, 1958, Ser. No. 766,600
2 Claims. (Cl. 43—42.2)

This invention relates to a fish lure and more particularly to a spinning lure.

The principal object of the invention is the provision of a spinning lure incorporating a novel spinning action.

A further object of the invention is the provision of a spinning lure having means for controlling the rate of revolution of the spinner element.

A still further object of the invention is the provision of a spinning lure in which the spinning element is movable longitudinally and has oppositely acting portions of a common spinning element.

A still further object of the invention is the provision of a spinning lure carrying a fish attracting light reflecting spinning element and an associated disguised hook. The spinning lure disclosed herein comprises an improvement in spinning lures heretofore known in the art in that the speed of rotation of the spinning element is controlled by providing the same with two deflecting surfaces. The principal deflecting surface imparts a clockwise rotation to the spinning element and would ordinarily tend to increase the rate of rotation of said element as the rate of the movement of the lure through the water is increased. The present invention incorporates a secondary deflector engaging the water stream in a different area from the area of the principal deflector and acting to urge the spinning element in a counter-clockwise movement. The result of the two actions, one of which opposes the other, is to control the effective rate of spin of the spinning element regardless of the speed with which the same is moved through the water.

The spinning element is positioned on a longitudinal body with double bearings to overcome frictional resistance between the moving parts of the lure and in motion creates a reflected light pattern which is quite similar to that created by a small fish or minnow thereby causing the lure to be effective in attracting a fish.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
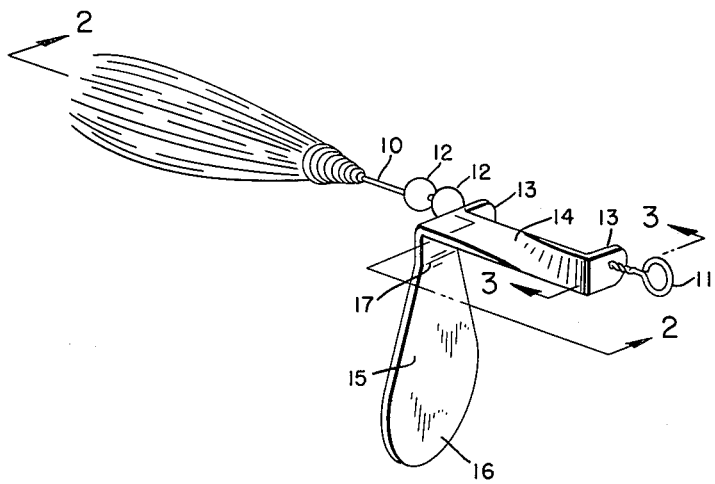
FIGURE 1 is a perspective view of the spinning lure.
Figure 2:
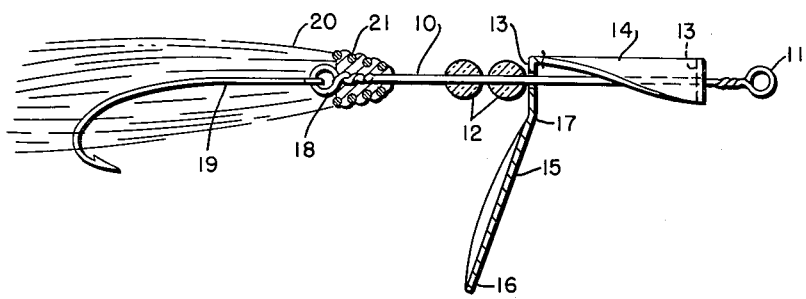
FIGURE 2 is a cross section on line 2—2 of FIGURE 1.
Figure 3:
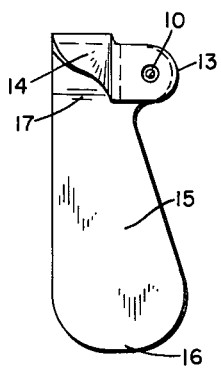
FIGURE 3 is a cross section on line 3—3 of FIGURE 1.

By referring to the drawings and FIGURES 1 and 2 in particular it will be seen that the spinning lure comprises a longitudinally extending straight body member 10 which takes the form of a thin shaft provided with an eyelet 11 at its forward end and carrying a pair of beads 12—12 thereon and a spinning element having two offset end portions 13—13 which are apertured and engaged in longitudinally spaced relation on the shaft 10.

The spinning element includes a longitudinally extending twisted portion 14 intermediate the offset portions 13—13. The twisted portion 14 comprises a section incorporating a 90° change in plane from one end to the other and each end of which is offset at 90° thereto to form the offset end portions 13—13, one of which is relatively wider than the other. A relatively larger outwardly extending part of the rearmost offset portion 13 is shaped to form an angularly disposed blade 15, the outer most section of the blade 15 has a curved end section 16 which is substantially wider than an inner end portion 17 thereof. The blade 15 forms a deflector which, when the lure is passed through the water, imparts a clockwise revolving motion to the blade 15 as well as the twisted portion 14 heretofore referred to.

The angle of the blade 15 is oppositely disposed with respect to the transverse angle of the twisted portion 14 of the spinning lure so that the twisted portion 14 tends to urge the spinner including the blade 15 to revolve in a counter-clockwise direction. This action thus opposes the dominating action of the blade 15 which rotates the spinner in a clockwise direction and acts to maintain the rate of revolution of the spinner at a moderately slow pace as compared with the action which would result if the twisted portion 14 of the spinner were eliminated.

The formation of the spinner element with the twisted portion 14 spacing the offset end portions 13—13 longitudinally on the shaft 10 provides a greater freedom of action, overcoming the frictional losses which would occur with a shorter spaced bearing structure.

The spinner in motion operates against the beads 12—12 which being positioned on the shaft 10 eliminates frictional drag in the thrust bearing thus formed.

The rear end of the shaft 10 has a secondary eyelet 18 therein which engages the eyelet of a fish hook 19 which is freely pivoted thereby and the lure preferably includes a disguising tail 20 secured to the shaft 10 by removable fasteners 21 adjacent the eyelet 18.

It will thus be seen that when the spinning lure is secured to a fish line by means of the eyelet 11 and drawn thru the water the lure will be actuated by the relative motion thereof with respect to the water through which it passes to provide a controlled rate of rotation which results in the bright light reflecting surfaces of the blade 15 and those of the twisted portion 14 of the spinning element forming a reflected light pattern quite similar to that of a small fish or a minnow swimming at a moderate speed. The lure is thus effective in attracting fish apparently because the light pattern seen by the fish is comparable with that occasioned by a smaller fish or minnow. It will thus be seen that the spinning lure disclosed herein meets the several objects of the invention and having thus described my invention, what I claim is:

1. In a spinning lure having an elongated body member in the form of a narrow shaft, eyelets formed at the opposite ends of said shaft and a hook attached to one of said eyelets; the improvement comprising an elongated first spinner element rotatably mounted on said shaft between said eyelets, said first spinner element comprising a strip like member having a longitudinally extending section twisted 90° between its end portions which end portions are disposed at right angles to said shaft and apertured to receive said shaft, the longitudinal axis of said twisted section being parallel with said shaft and positioned at one side thereof, a second spinning element formed on one of said end portions of said first spinning element and positioned on the same side of the shaft and comprising a blade extending outwardly therefrom, said blade being curved in a direction opposite to the direction of the twist of said element.

2. The spinning lure set forth in claim 1 and wherein the area of said outwardly extending blade forming said second spinner element is at least double the area of the twisted longitudinally extending section of the said first spinner element.

(References on following page)

References Cited in the file of this patent

UNITED STATES PATENTS

| | | | |
|---|---|---|---|
| D. 120,988 | Curtis | June 11, 1940 |
| 1,530,343 | Bayer | Mar. 17, 1925 |
| 1,620,972 | Hobbs | Mar. 15, 1927 |
| 1,740,273 | Shannon | Dec. 17, 1929 |
| 2,219,225 | Gambill | Oct. 22, 1940 |
| 2,569,792 | Wilson | Oct. 2, 1951 |